(12) United States Patent
Saum et al.

(10) Patent No.: US 10,890,510 B2
(45) Date of Patent: Jan. 12, 2021

(54) SYSTEM AND METHOD FOR ON-ENGINE COMPONENT DEFECT DETECTION

(71) Applicant: Cummins Inc., Columbus, IN (US)

(72) Inventors: Scott Saum, Columbus, IN (US); Marc E. Smith, Charlestown, IN (US); Jeffrey T. Galarno, Columbus, IN (US); Michael T. Stanley, Columbus, IN (US); Eric C. Proehl, Seymour, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 16/761,385

(22) PCT Filed: Jun. 11, 2018

(86) PCT No.: PCT/US2018/036819
§ 371 (c)(1),
(2) Date: May 4, 2020

(87) PCT Pub. No.: WO2019/089089
PCT Pub. Date: May 9, 2019

(65) Prior Publication Data
US 2020/0363293 A1 Nov. 19, 2020

Related U.S. Application Data

(60) Provisional application No. 62/582,034, filed on Nov. 6, 2017.

(51) Int. Cl.
*G01M 15/04* (2006.01)
*F02F 7/00* (2006.01)
(Continued)

(52) U.S. Cl.
CPC ......... *G01M 15/042* (2013.01); *F02F 7/0053* (2013.01); *G01N 27/87* (2013.01); *F16C 3/06* (2013.01); *F16C 7/00* (2013.01)

(58) Field of Classification Search
CPC .... G01M 15/04; G01M 15/042; G01M 15/06; G01M 15/12
(Continued)

(56) References Cited

U.S. PATENT DOCUMENTS 4,637,144 A   1/1987 Schemel
4,730,484 A * 3/1988 Olschefski ............. G01H 1/003
                                                  73/114.81
(Continued)

FOREIGN PATENT DOCUMENTS

GB     1572281 A      7/1980
JP     2015044249 A   3/2015

OTHER PUBLICATIONS

International Search Report and Written Opinion issued by the ISA/US, Commissioner for Patents, dated Sep. 11, 2018, for International Application No. PCT/US2018/036819; 7 pages.
(Continued)

*Primary Examiner* — Eric S. McCall
(74) *Attorney, Agent, or Firm* — Faegre Drinker Biddle & Reath LLP

(57) ABSTRACT

A device is disclosed for measuring Barkhausen noise of a crankshaft to identify defects in the crankshaft while the crankshaft is installed on an engine, comprising: a housing configured to attach to a connecting rod; at least one sensor assembly mounted to the housing including at least one Barkhausen noise sensor; and a spring disposed between the housing and the at least one Barkhausen noise sensor to urge the at least one Barkhausen noise sensor into contact with a pin journal of the crankshaft as the crankshaft rotates.

25 Claims, 16 Drawing Sheets

(51) Int. Cl.
    *G01N 27/87*     (2006.01)
    *F16C 3/06*     (2006.01)
    *F16C 7/00*     (2006.01)

(58) Field of Classification Search
    USPC .......................................... 73/114.77, 114.81
    See application file for complete search history.

(56) References Cited

U.S. PATENT DOCUMENTS

| | | | | |
|---|---|---|---|---|
| 5,469,741 | A * | 11/1995 | Scourtes | G01M 1/22 73/462 |
| 7,454,961 | B2 * | 11/2008 | Pirone | G01D 5/147 73/114.26 |
| 7,849,734 | B2 * | 12/2010 | Moritani | G01M 15/02 73/116.05 |
| 2005/0248338 | A1 | 11/2005 | Zimmermann et al. | |
| 2014/0331753 | A1 * | 11/2014 | Wiebrecht | F16C 17/243 73/114.81 |
| 2014/0331754 | A1 * | 11/2014 | Wiebrecht | G01M 13/04 73/114.81 |
| 2017/0152885 | A1 | 6/2017 | Kato et al. | |
| 2017/0307005 | A1 * | 10/2017 | Ejakov | F16C 9/04 |
| 2018/0172436 | A1 * | 6/2018 | Isei | G01B 11/25 |

OTHER PUBLICATIONS

International Preliminary Report on Patentability issued by the International Bureau of WIPO, dated May 12, 2020 for International Application No. PCT/US2018/036819; 6 pages.

\* cited by examiner

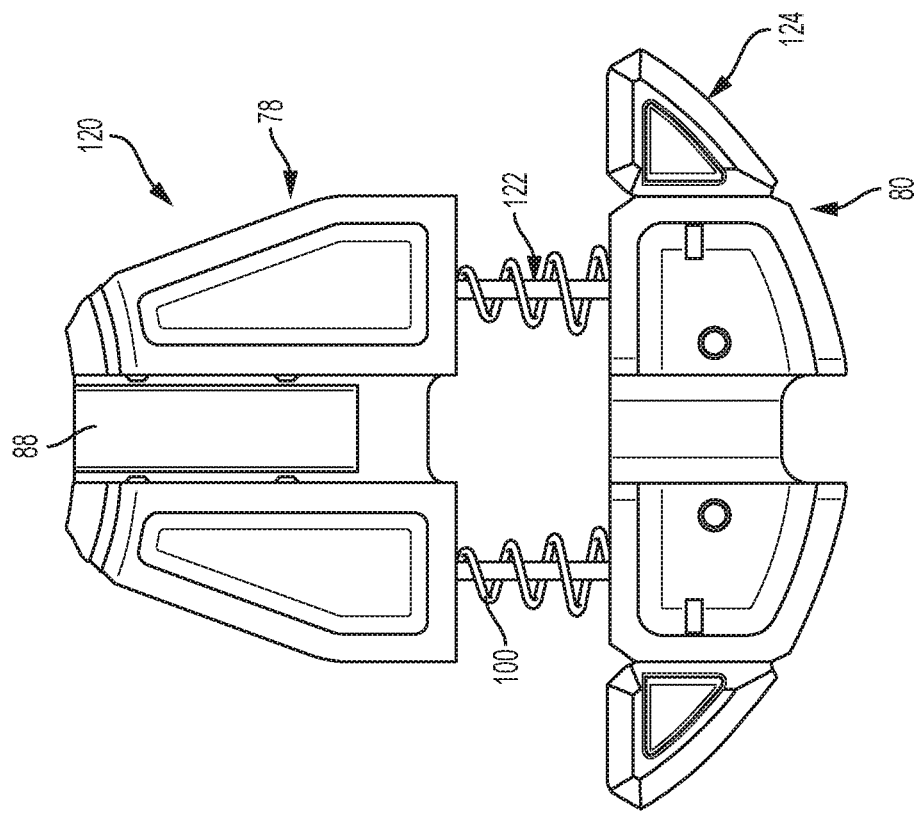
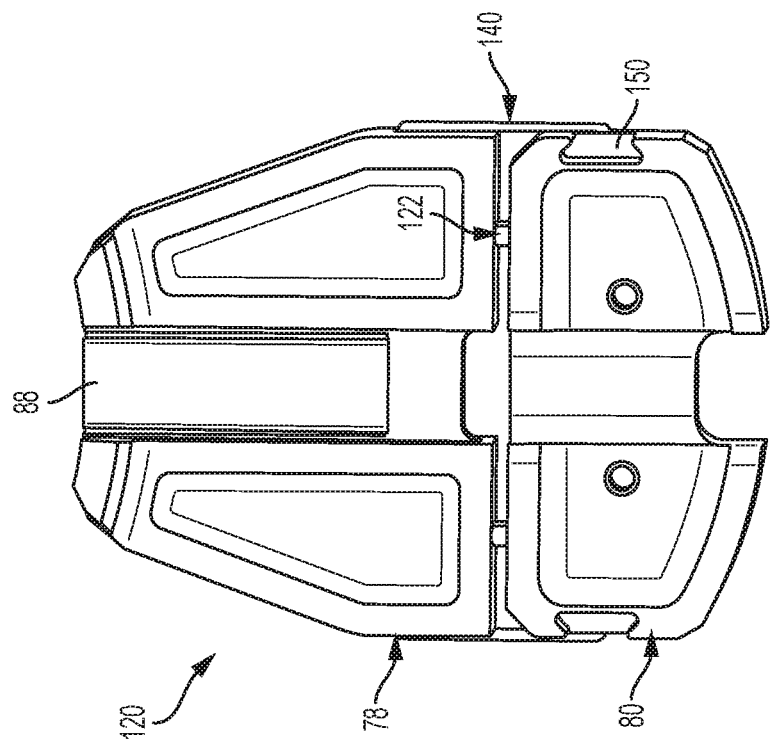

SYSTEM AND METHOD FOR ON-ENGINE COMPONENT DEFECT DETECTION

CROSS-REFERENCE TO RELATED APPLICATIONS

This application is a national stage application entry of International Patent Application Number PCT/US2018/036819, filed Jun. 11, 2018, which in turn claims priority to U.S. Provisional Patent Application Ser. No. 62/582,034, entitled "SYSTEM AND METHOD FOR ON-ENGINE COMPONENT DEFECT DETECTION," filed on Nov. 6, 2017, the entire contents of which being hereby expressly incorporated herein by reference.

FIELD OF THE DISCLOSURE

The present disclosure generally relates to on-engine detection of component defects, and more particularly to systems and methods for detecting crankshaft defects using Barkhausen noise sensors while the crankshaft is installed in an engine.

BACKGROUND

Certain engine components, such as crankshafts, may contain defects when installed in engines or develop defects during use. One such defect is "grinder burn," which may occur during manufacture of the crankshaft and result from excess heat during grinding and polishing. The excess heat may create a reduction in compression stress on the crankshaft or other defects on the surface of the crankshaft and elsewhere. Such defects may be detected using Barkhausen noise sensors, which provide signals that permit identification of changes in material properties even at the micron level, as is understood by those skilled in the art. Barkhausen sensors essentially detect small changes in magnetization of ferromagnetic material, and the signals, detected by coil windings are amplified using a load speaker. Barkhausen sensors may be moved 360 degrees about a surface of a crankshaft pin or main to detect changes in magnetic field which indicate structural defects.

When a crankshaft is installed in an engine with such defects, or develops defects (such as a scratch, crack or burr) during use, the crankshaft must typically be removed from the engine and measured to identify the defects. This approach is disadvantageous for several reasons. Some engines are difficult to access and disassemble because of the application on which they are installed. If the crankshaft can be removed in the field, the process is very time consuming and expensive in terms of labor and engine down time. In situations where the engine is replaced and relocated to a service facility for crankshaft inspection, the costs are high due to the expense associated with a replacement engine, while engine down time may be reduced compared to in field inspection and repair. In any event, a need exists for inspecting crankshafts in engines to identify defects.

SUMMARY

According to one embodiment, the disclosure provides a device for identifying defects in a crankshaft while the crankshaft is installed on an engine, comprising: a housing configured to attach to a connecting rod; at least one sensor assembly mounted to the housing including at least one sensor; and a spring disposed between the housing and the at least one sensor to urge the at least one sensor into contact with a pin journal of the crankshaft as the crankshaft rotates. In one aspect of this embodiment, the at least one sensor assembly includes a first pin journal sensor assembly, a second pin journal sensor assembly and a pin fillet sensor assembly. In a variant of this aspect, the first pin journal sensor assembly includes a first sensor cage, a first Barkhausen noise sensor disposed at least partially within the first sensor cage, a first slide assembly attached between a first cutout in the housing and the first sensor cage, and a first spring positioned to urge the first Barkhausen noise sensor into contact with the pin journal as the crankshaft rotates. In another variant, the first slide assembly includes a first guide rail attached to the first cutout and a first rail channel attached to the first sensor cage, the first guide rail being configured to move along a longitudinal axis of the first rail channel. An additional variant further includes a first spring retainer attached to the housing and positioned to compress the first spring between the first spring retainer and a tab extending from the first sensor cage to thereby urge the first sensor cage and the first Barkhausen noise sensor toward the pin journal. In yet another variant, the second pin journal sensor assembly includes a second sensor cage, a second Barkhausen noise sensor disposed at least partially within the second sensor cage, a second slide assembly attached between a second cutout in the housing and the second sensor cage, and a second spring positioned to urge the second Barkhausen noise sensor into contact with the pin journal as the crankshaft rotates. In a further variant, the second slide assembly includes a second guide rail attached to the second cutout and a second rail channel attached to the second sensor cage, the second guide rail being configured to move along a longitudinal axis of the second rail channel. In another variant, the device further includes a second spring retainer attached to the housing and positioned to compress the second spring between the second spring retainer and a tab extending from the second sensor cage to thereby urge the second sensor cage and the second Barkhausen noise sensor toward the pin journal. In anther variant, the pin fillet sensor assembly includes a third Barkhausen noise sensor positioned to contact a pin fillet of the crankshaft as the crankshaft rotates.

In another embodiment, the present disclosure provides a device for identifying defects in a main journal of a crankshaft while the crankshaft is installed on an engine, comprising: a fixture configured to mount between a main bearing cap and the main journal, the fixture comprising an upper housing having at least one sensor mounted thereto and positioned to engage the main journal; a lower housing having a lower surface to engage the main bearing cap; and at least one spring disposed between the upper housing and the lower housing to urge the upper housing toward the main journal, thereby maintaining the at least one sensor in contact with the main journal as the crankshaft rotates. In one aspect of this embodiment, the upper housing includes a curved upper surface having a pair of cutouts configured to receive a corresponding pair of sensors. In another aspect, the at least one spring includes four springs, each of the four springs having one end disposed in a spring seat formed in the lower housing and another end disposed on a spring button formed in the upper housing. In a variant of this aspect, each of the four springs is conical. In another aspect, the fixture further includes at least one guide stud having a lower end connected to a bore formed in the lower housing and a body that extends through the at least one spring into an opening formed in the upper housing. In a variant of this aspect, the at least one guide stud includes an upper end that extends into the opening and receives a retaining washer. In a further variant, the opening includes an access opening for installing the retaining washer onto the upper end of the at least one guide stud. In another aspect, the fixture further includes a C-clip having an upper end and a lower end, the upper housing having a slot configured to receive the upper end of the C-clip and the lower housing having a slot configured to receive the lower end of the C-clip such that when the C-clip is installed, the upper housing and the lower housing are held by the C-clip in a compressed state to permit installation of the fixture between the main bearing cap and the main journal. In yet another aspect, the fixture further comprises a pair of anti-rotation wings coupled to the lower housing. In still another aspect, the at least one sensor is a Barkhausen noise sensor.

In yet another embodiment, the present disclosure provides a ystem for identifying defects in a crankshaft mounted in an engine, comprising: a first fixture having a first housing configured to couple to a connecting rod, and a first sensor assembly including a first pin journal sensor and a first spring situated to urge the first pin journal sensor into contact with a pin journal of the crankshaft as the crankshaft rotates; and a second fixture having a second housing with a second sensor assembly including a second main journal sensor mounted thereto, and at least one second spring situated to urge the second main journal sensor into contact with a main journal of the crankshaft as the crankshaft rotates. In one aspect of this embodiment, the first sensor assembly includes a first sensor cage and a first slide assembly attached between a first cutout in the first housing and the first sensor cage, the first pin journal sensor being at least partially within the first sensor cage. In a variant of this aspect, the first fixture further incudes a second sensor assembly including a second pin journal sensor and a second spring situated to urge the second pin journal sensor into contact with the pin journal as the crankshaft rotates. In another aspect, the first pin journal sensor is a Barkhausen noise sensor and the second main journal sensor is a Barkhausen noise sensor.

In still another embodiment, the present disclosure provides a method for detecting defects in a crankshaft while the crankshaft is installed in an engine, comprising: replacing an end rod cap of a connecting rod with a pin fixture sized to approximately match a diameter of a pin journal of the crankshaft, the pin fixture including at least one sensor biased into contact with the pin journal; and rotating the crankshaft. In one aspect of this embodiment, the at least one sensor is a Barkhausen noise sensor.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein;

FIG. 16A is a side view of the main fixture of FIG. 13 in a compressed state; and FIG. 16B is a side view of the main fixture of FIG. 13 in an expanded state.

Figure 1:
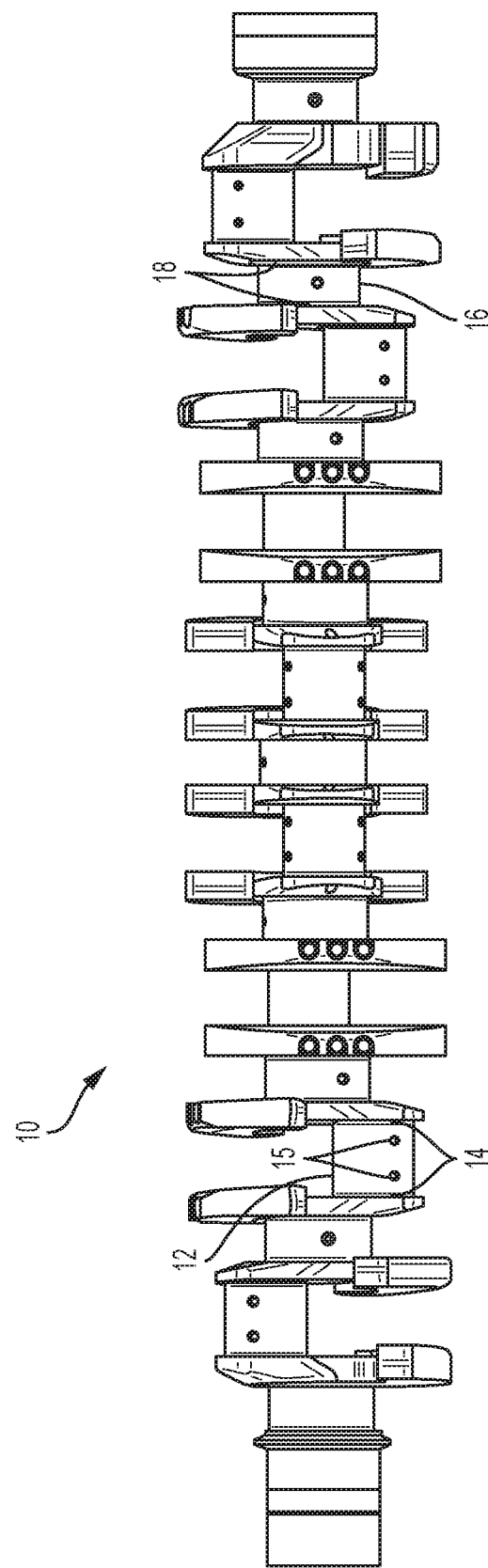
FIG. 1 is a side view of a crankshaft.

Although the drawings represent embodiments of the various features and components according to the present disclosure, the drawings are not necessarily to scale and certain features may be exaggerated in order to better illustrate and explain the present disclosure. The exemplification set out herein illustrates embodiments of the disclosure, and such exemplifications are not to be construed as limiting the scope of the disclosure in any manner.

DETAILED DESCRIPTION OF EMBODIMENTS OF THE DISCLOSURE

For the purpose of promoting an understanding of the principles of the disclosure, reference will now be made to the embodiments illustrated in the drawings, which are described below. It will nevertheless be understood that no limitation of the scope of the disclosure is thereby intended. The disclosure includes any alterations and further modifications in the illustrated device and described methods and further applications of the principles of the disclosure, which would normally occur to one skilled in the art to which the disclosure relates. Moreover, the embodiments were selected for description to enable one of ordinary skill in the art to practice the disclosure.

Referring now to FIG. 1, a crankshaft for a Vee engine is shown. Crankshaft 10 includes pin journals 12 and pin fillets 14 and main journals 16 and main fillets 18 as is known by those skilled in the art. These are high stress areas of crankshaft 10 and generally locations where defects may be present. Two piston connecting rods (not shown) are attached to each of pin journals 12 to drive rotation of the crankshaft 10 in response to fuel combustion in a conventional manner.

Figure 2:
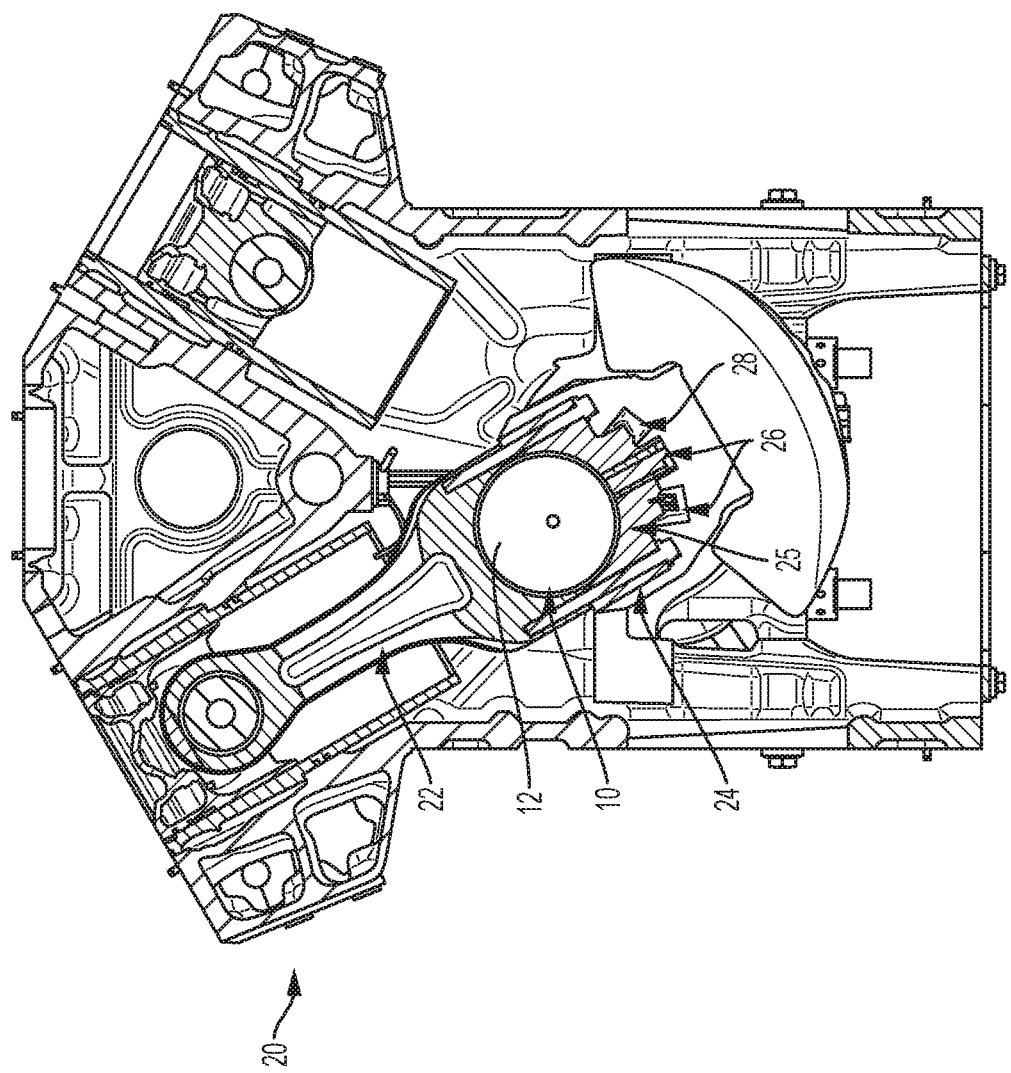
FIG. 2 is a side, cross-sectional view of a Vee engine showing a connecting rod and an attached pin fixture for measuring defects in a crankshaft pin journal and/or fillet according to one embodiment of the present disclosure.
Figure 3:
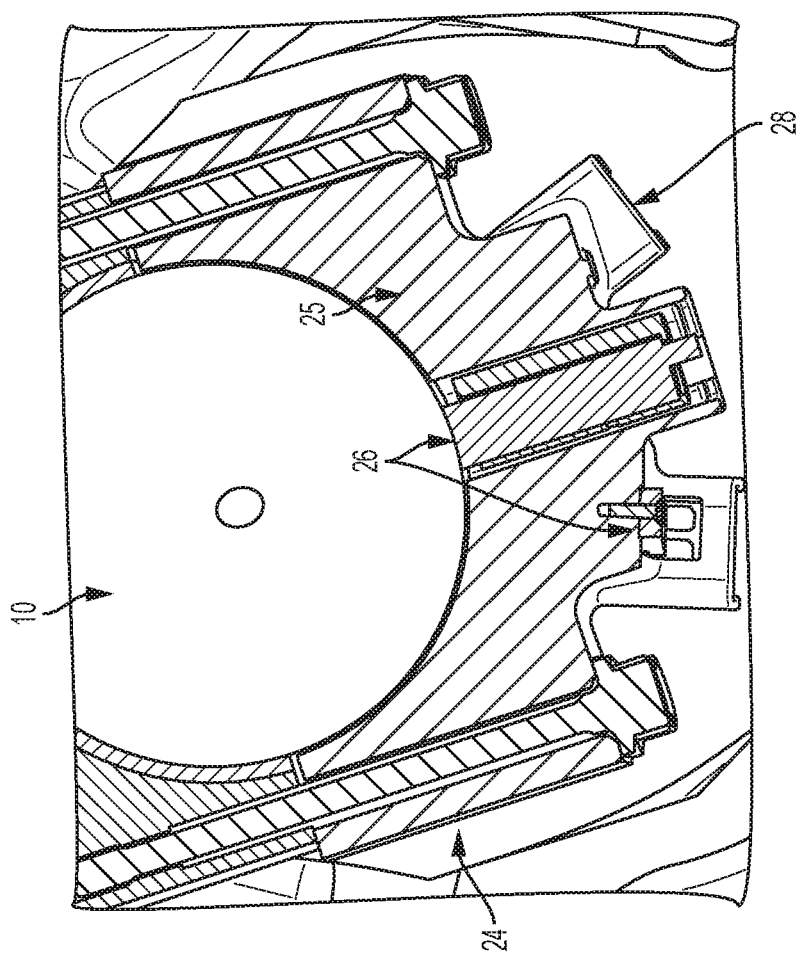
FIG. 3 is an enlarged, side, cross-sectional view of the pin fixture shown in FIG. 2.
Figure 4:
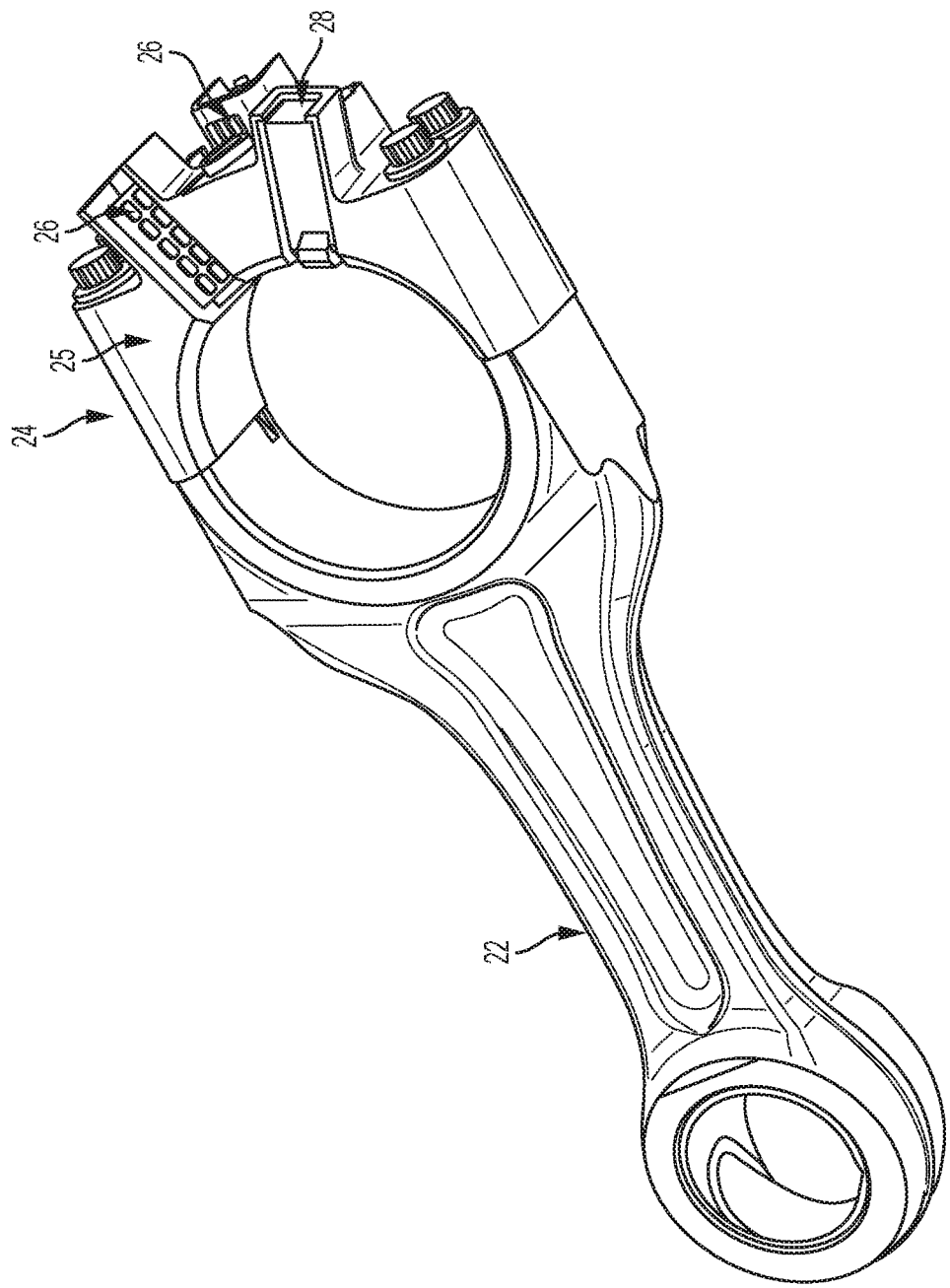
FIG. 4 is a perspective view of the pin fixture of FIG. 2 attached to a connecting rod.

In FIG. 2, crankshaft 10 is shown installed in an engine 20. One connecting rod 22 is shown connected to a pin journal 12 of crankshaft 10. As shown in FIGS. 2-4, a pin fixture 24 according to one embodiment of the present disclosure is connected to connecting rod 22 in place of the large end rod cap. Pin fixture 24 is sized to approximately match the bearing diameter and generally includes a fixture housing 25, two pin journal sensor assemblies 26 and a pin fillet sensor assembly 28 as is further described below. Only one pin fillet sensor assembly 28 is needed because each connecting rod 22 connected to pin journal 12 (refer to FIG. 1) is only adjacent one pin fillet 14. Two pin journal sensor assemblies 26 are used to inspect more surface of pin journal 12 than could be inspected with one assembly. Referring back to FIG. 1, one pin journal sensor assembly 26 inspects the circumferential surface of pin journal 12 between one pin fillet 14 and one of the two oil holes 15. The other pin journal sensor assembly 26 inspects the circumferential surface of pin journal 12 between one of the oil holes 15 and approximately half way between the two oil holes 15.

Figure 5:
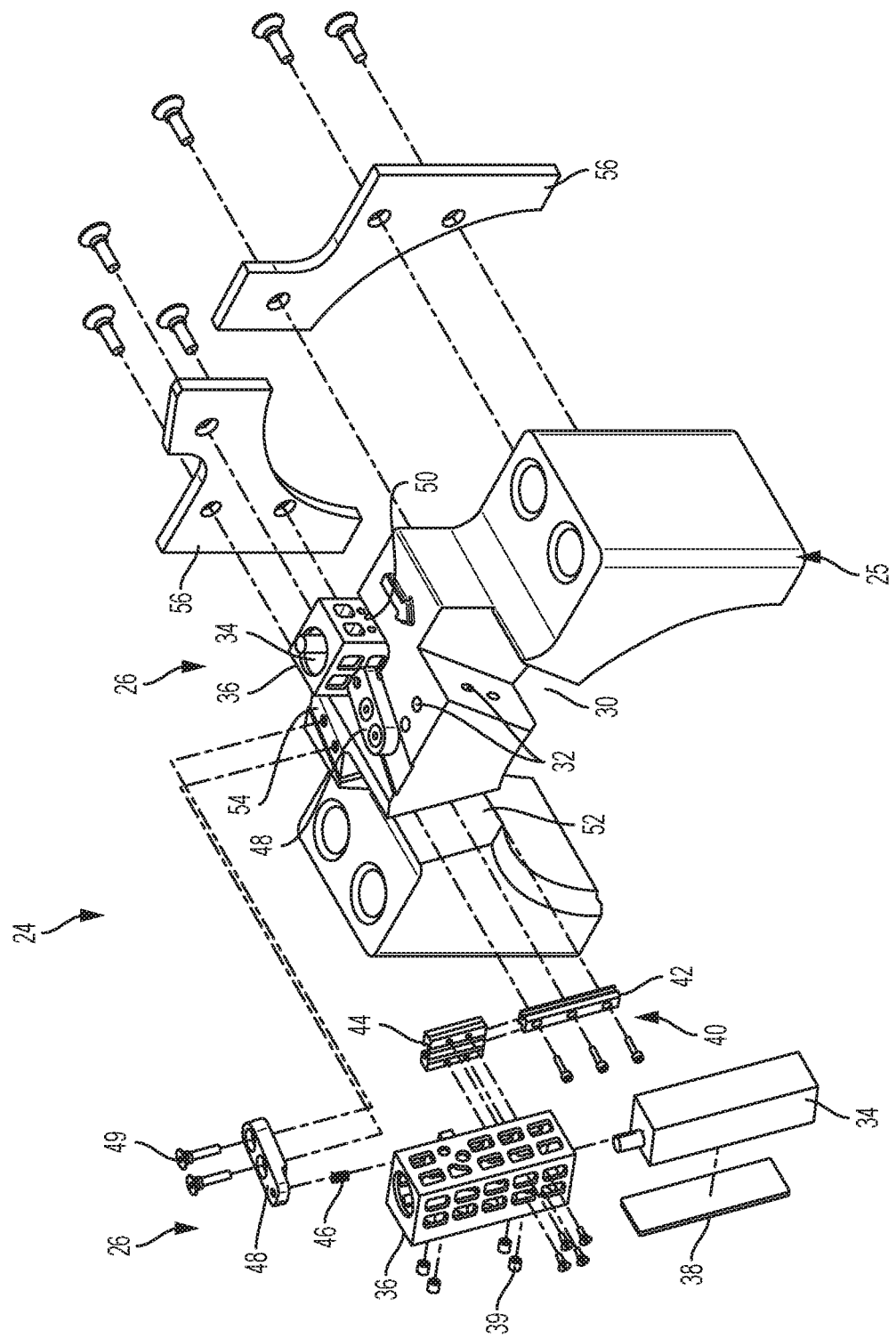
FIG. 5 is an exploded perspective view of the pin fixture of FIG. 2.

Referring now to FIG. 5, pin fixture 24 is shown in a partially exploded view. One pin journal sensor assembly 26 is shown installed onto fixture housing 25. Pin fillet sensor assembly 28 is not shown, but is installed in cutout 30 of fixture housing 25. A pair of angled bores 32 are formed in fixture housing 25 to receive set screws (not shown) that engage pin fillet sensor assembly 28 and retain it within cutout 30.

Figure 6:
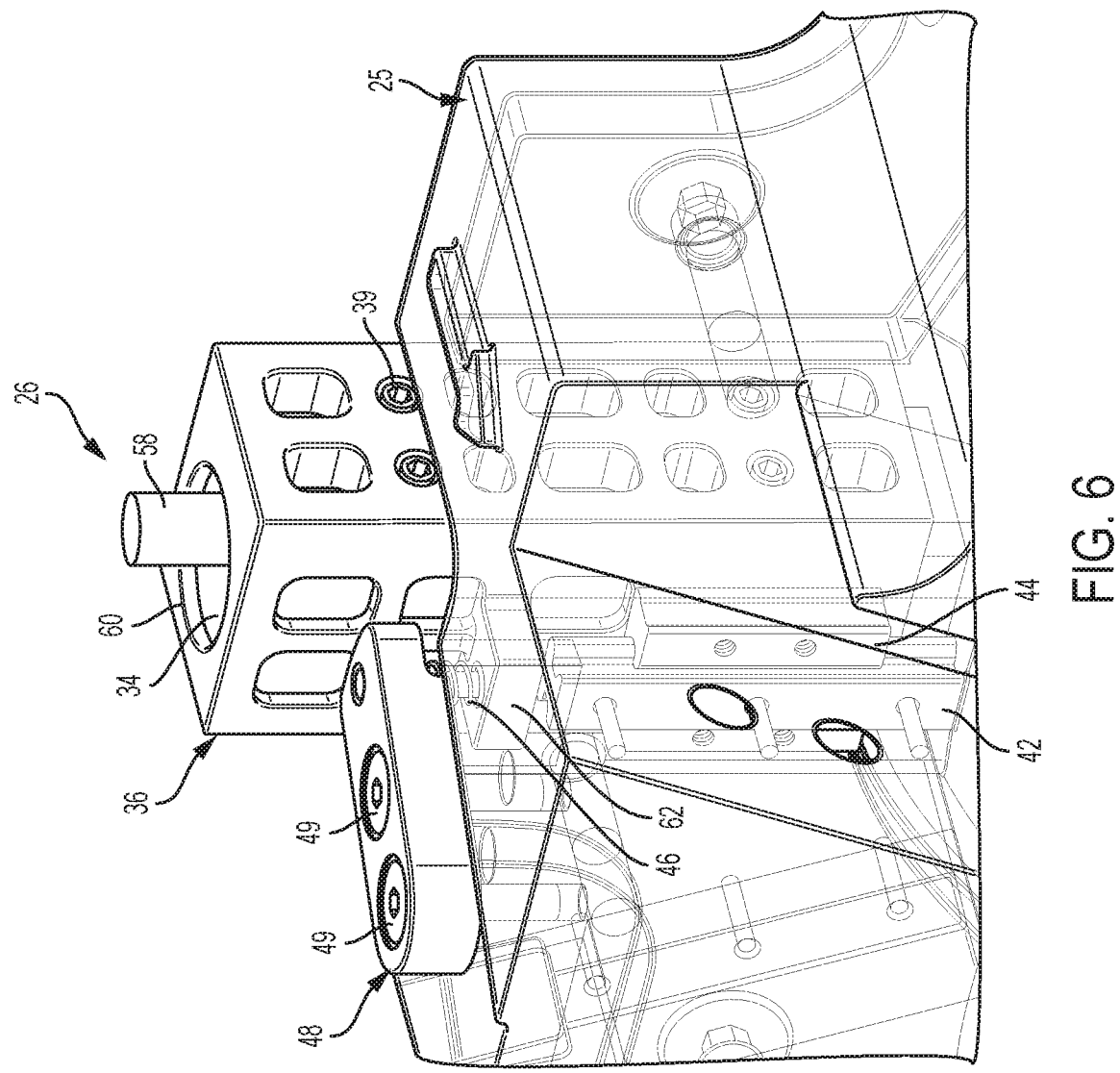
FIG. 6 is a perspective view of one pin journal sensor arrangement of the pin fixture of FIG. 2.
Figure 12:
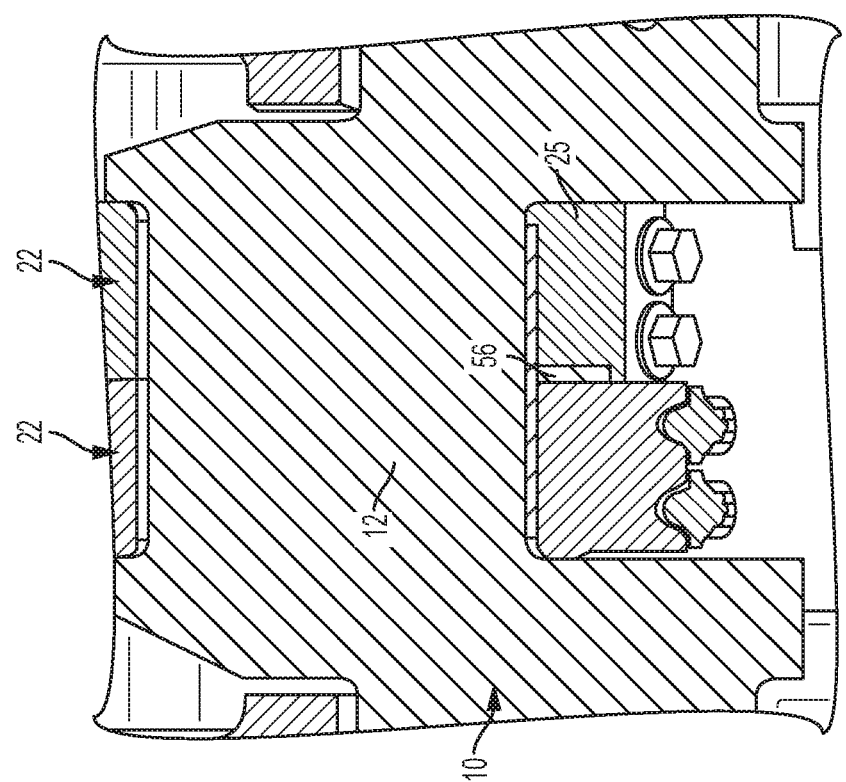
FIG. 12 is a side cross-sectional view of the pin fixture of FIG. 2 installed on a crankshaft.

Referring to FIGS. 5 and 6, each pin journal sensor assembly 26 generally includes a Barkhausen sensor 34, a sensor cage 36, a shim plate 38, a slide assembly 40 including a guide rail 42 and a rail channel 44, a spring 46 and a spring retainer 48. This description will refer to "Barkhausen sensors" but it should be understood that other sensors capable of detecting defects of the kind described herein may also be used. One pin journal sensor assembly 26 is installed onto fixture housing 25 at cutout 50 and the other assembly 26 (shown in exploded view) is installed at cutout 52. Referring just to the exploded pin journal sensor assembly 26, guide rail 42 is mounted in cutout 52 using screws or other fasteners and rail channel 44 is attached to sensor cage 36 using screws or other fasteners. Shim plate 38 is installed into sensor cage 36 and sensor 34 is installed into sensor cage 36 adjacent shim plate 38. Set screws 39 are threaded through openings in cage 36 and engage shim plate 38, thereby urging shim plate 38 against sensor 34 and sensor 34 against a wall of cage 36 to secure sensor 34 in place. Shim plate 38 prevents damage to sensor 34 by the set screws. Sensor cage 36 with sensor 34 installed and rail channel 44 attached is installed downwardly into cutout 52 such that guide rail 42 is received by rail channel 44. Slide assembly 40 ensures that sensor 34 moves only along its longitudinal axis and not from side to side. Spring 46 is installed onto spring retainer 48 and the assembly is positioned within slot 54 formed in fixture housing 25. A pair of screws 49 are installed through spring retainer 48 into threaded openings in fixture housing 25 to secure spring retainer 48 and spring 46 in place. A pair of wear plates 56 are also attached to fixture housing 25 as shown in FIG. 5. As shown in FIG. 12, wear plates 56 fill the gap between the adjacent connecting rod 22 and fixture housing 25 to prevent axial movement of the rods 22 along the axis of pin journal 12. Wear plates 56 are removable to permit use of other wear plates of different thickness to accommodate different gap dimensions. While not shown in FIG. 5, pin fillet sensor assembly 28 is installed onto fixture housing 25 at cutout 30 (see FIG. 4).

As best shown in FIG. 6, a lead wire 58 extends through an opening 60 in the top of sensor cage 36. Lead wire 58 is connected to receiving equipment through wiring (not shown) to receive and process the signals from sensor 34 to identify defects. A tab 62 projects from one side of sensor cage 36. Spring 46 bears against tab 62 and urges tab 62 (and sensor cage 36) downwardly such that sensor 34 remains in constant contact with the surface of pin journal 12 as crankshaft 10 rotates. As indicated above, sensor cage 36 and sensor 34 can move slightly along the longitudinal axis of sensor 34 as guide channel 44 slides on rail 42, but the close tolerances between guide channel 44 and rail 42 prevent motion in all other directions. It should be understood, of course, that guide channel 44 may be attached to fixture housing 25 and rail 42 may be attached to sensor cage 35 in alternative embodiments. Tab 62 also functions as a stop and can engage the upper end of rail 42 to limit the downward movement of sensor cage 36 and sensor 34.

Figure 7:
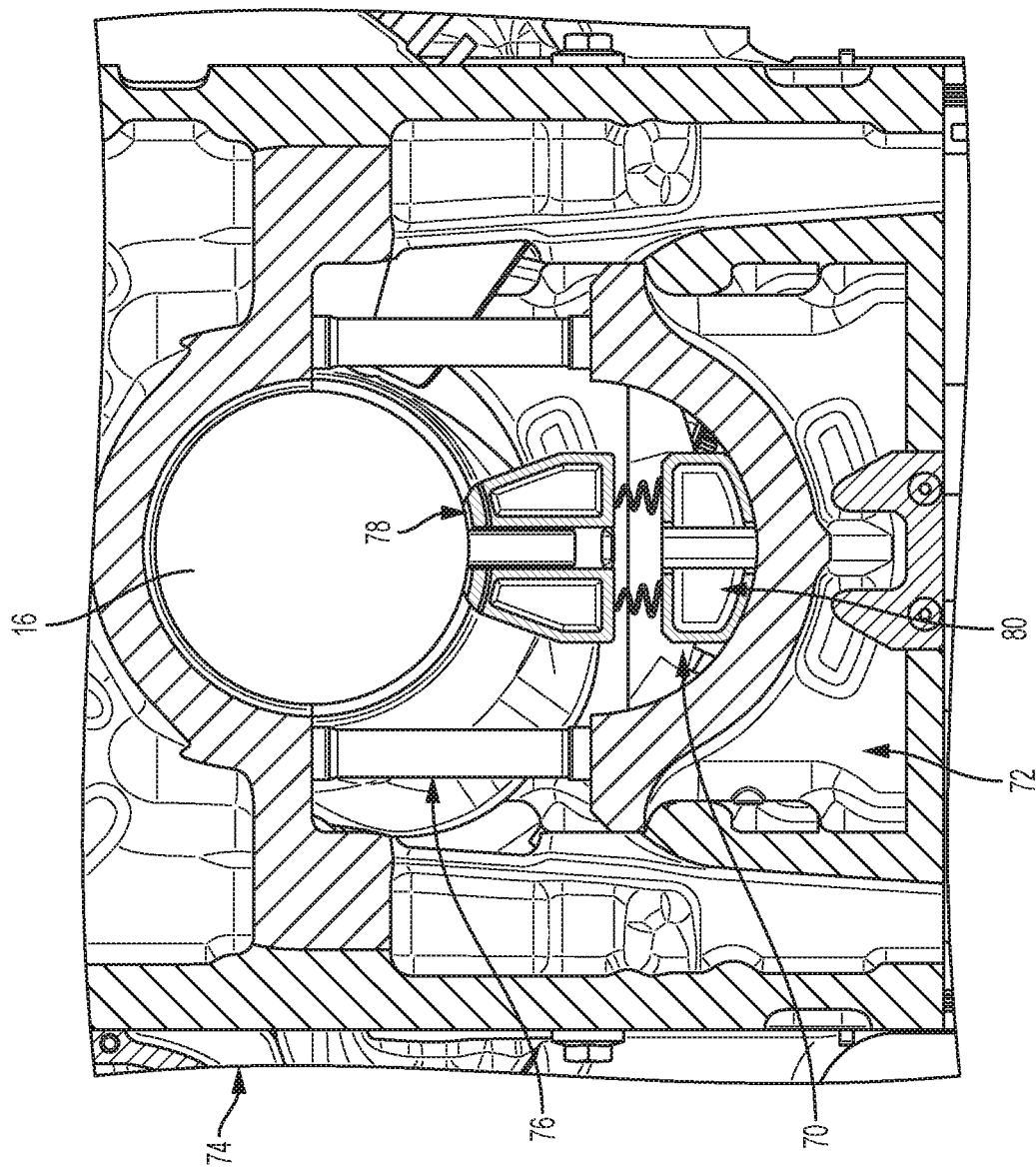
FIG. 7 is a side, cross-sectional view of a main fixture for measuring defects in a crankshaft main journal according to one embodiment of the present disclosure mounted on a main bearing.
Figure 8:
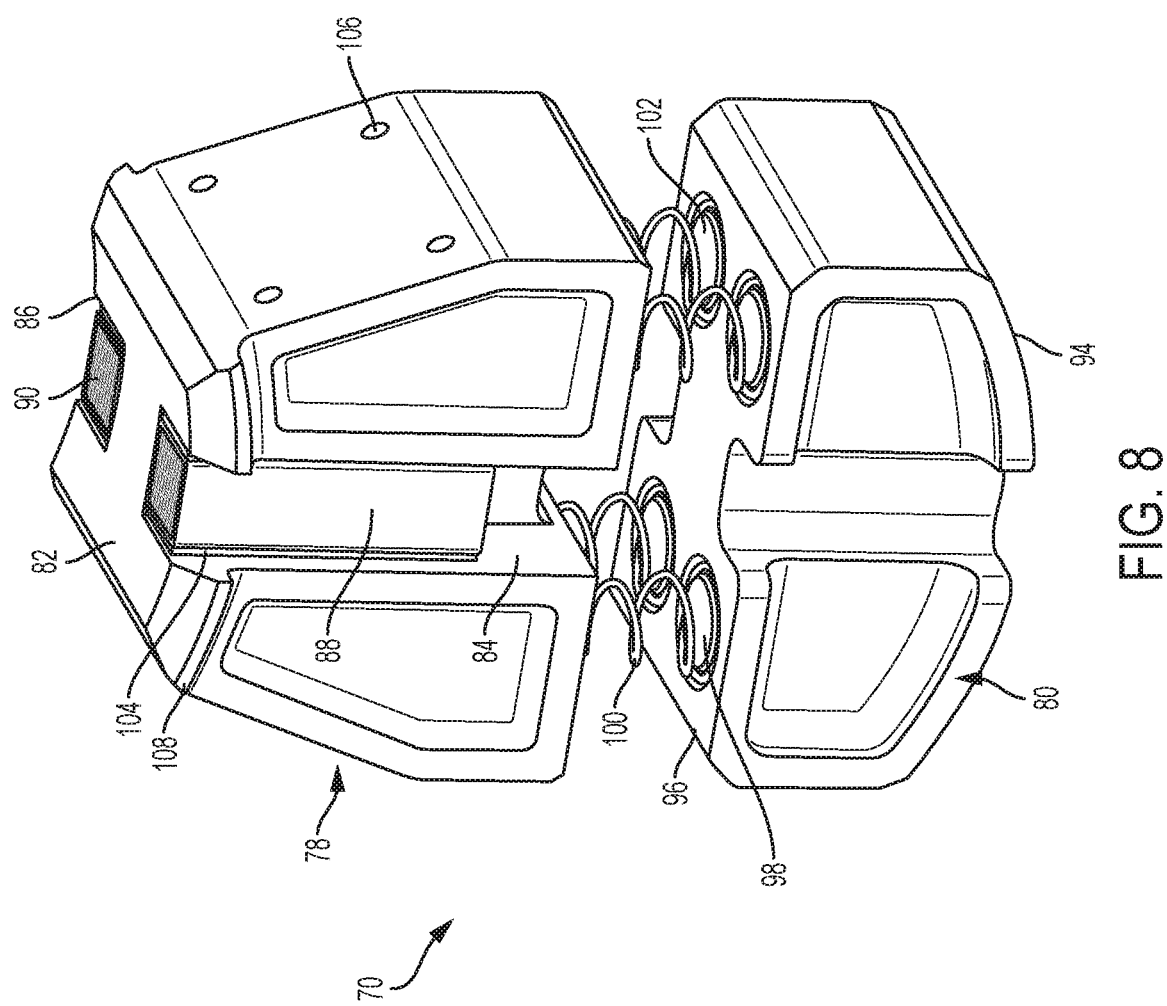
FIG. 8 is a perspective view of the main fixture of FIG. 7.
Figure 9:
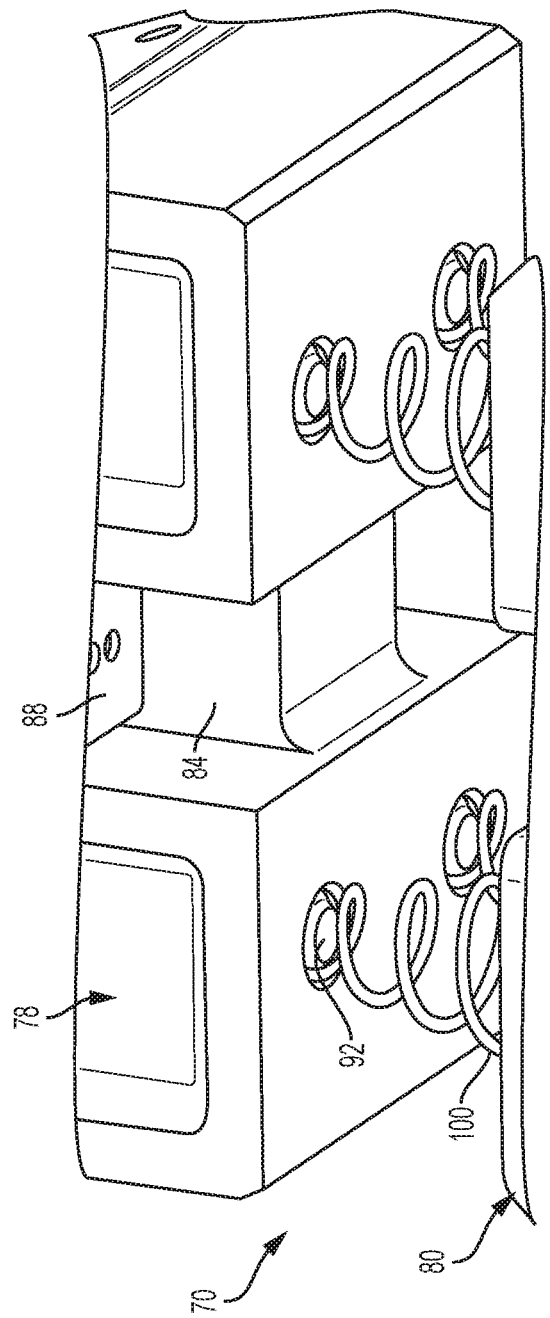
FIG. 9 is an enlarged perspective view of the main fixture of FIG. 7.

Referring now to FIG. 7, a main fixture 70 is shown installed between a main journal 16 and a main bearing cap 72. Main fixture 70 is installed into position by first lowering main bearing cap 72 away from the engine block 74. Bearing cap studs 76 retain main bearing cap 72 in position. As is further described below, main fixture 70 is compressed, placed in position as shown in FIG. 7, and allowed to expand such that main fixture 70 is situated between main bearing cap 72 and main journal 16 of crankshaft 10.

Figure 11B:
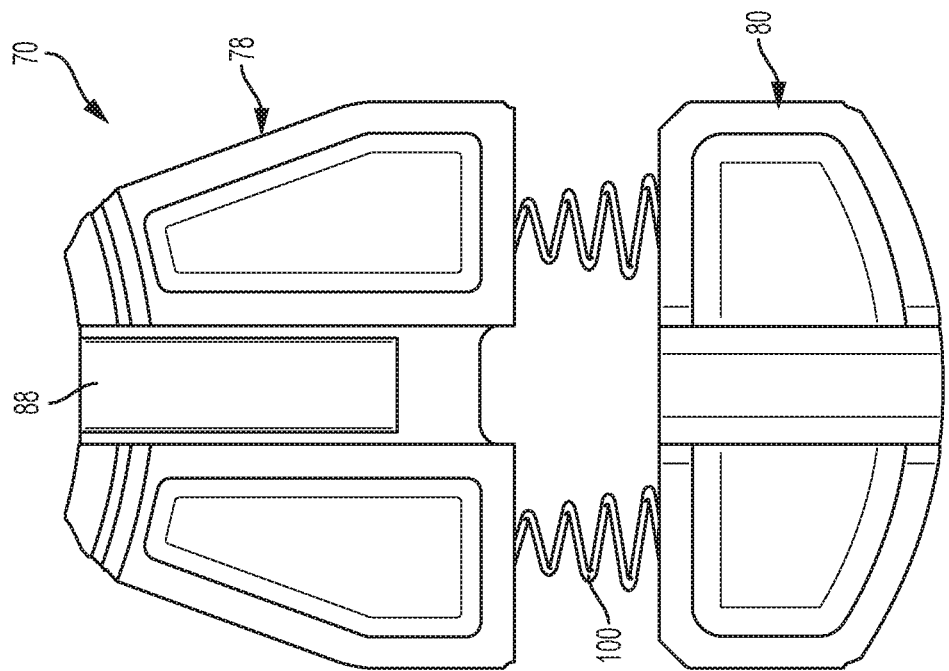
FIG. 11B is a side view of the main fixture of FIG. 7 in an expanded state.
Figure 11A:
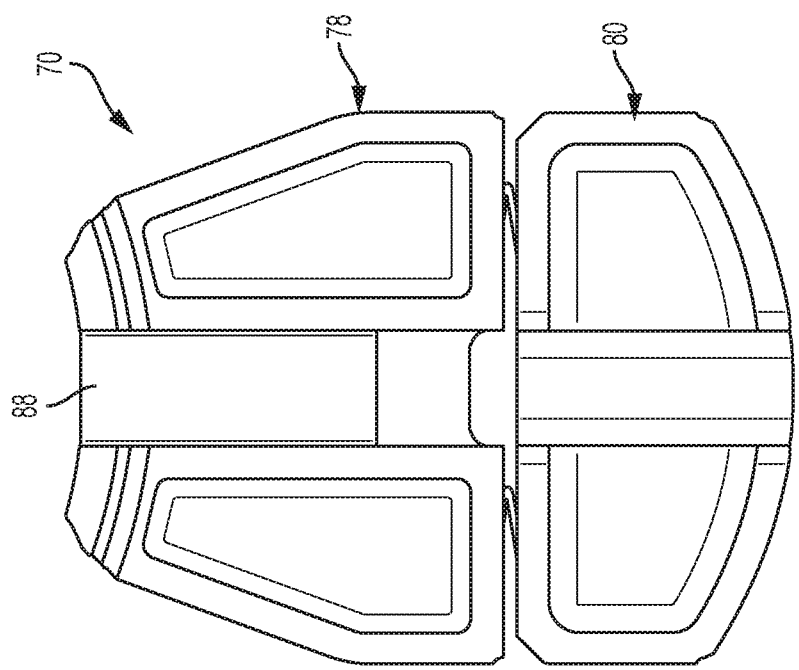
FIG. 11A is a side view of the main fixture of FIG. 7 in a compressed state.

As best shown in FIGS. 8, 9, 11A and 11B, main fixture 70 generally includes an upper housing 78 and a lower housing 80. Upper housing 78 includes a curved upper surface 82, a pair of cutouts 84, 86 for receiving Barkhausen journal sensors 88, 90 and four spring buttons 92. Lower housing 80 includes a curved lower surface 94 and an upper surface 96 which has four spring seats 98 located to align with spring buttons 92 of upper housing 78. Four springs 100 are positioned within spring seats 98 and onto spring buttons 92. In the embodiment shown, each of springs 100 has a large end that is received by a spring seat 98 and a small end that is received by a spring button 92. Springs 100 nest around locating buttons 92 and similar buttons 102 formed in spring seats 98. In alternative embodiments, springs 100 may have shapes other than conical such a cylindrical. Moreover, springs 100 may be mounted on studs that extend from one of upper housing 78 or lower housing 80 into openings formed in the other of upper housing 78 or lower housing 80. FIG. 11A shows main fixture 70 in a compressed state and FIG. 11B shows main fixture 70 in an expanded state. Journal sensors 88, 90 are mounted within cutouts 84, 86 by first sandwiching sensors 88, 90 between shims 104 (or at least one shim 104) and placing the sandwiched assemblies into cutouts 84, 86. Set screws (not shown) are then threaded into openings 106 formed in upper housing 78 and tightened to engage shims 104 and hold sensors 88, 90 in place.

Figure 10:
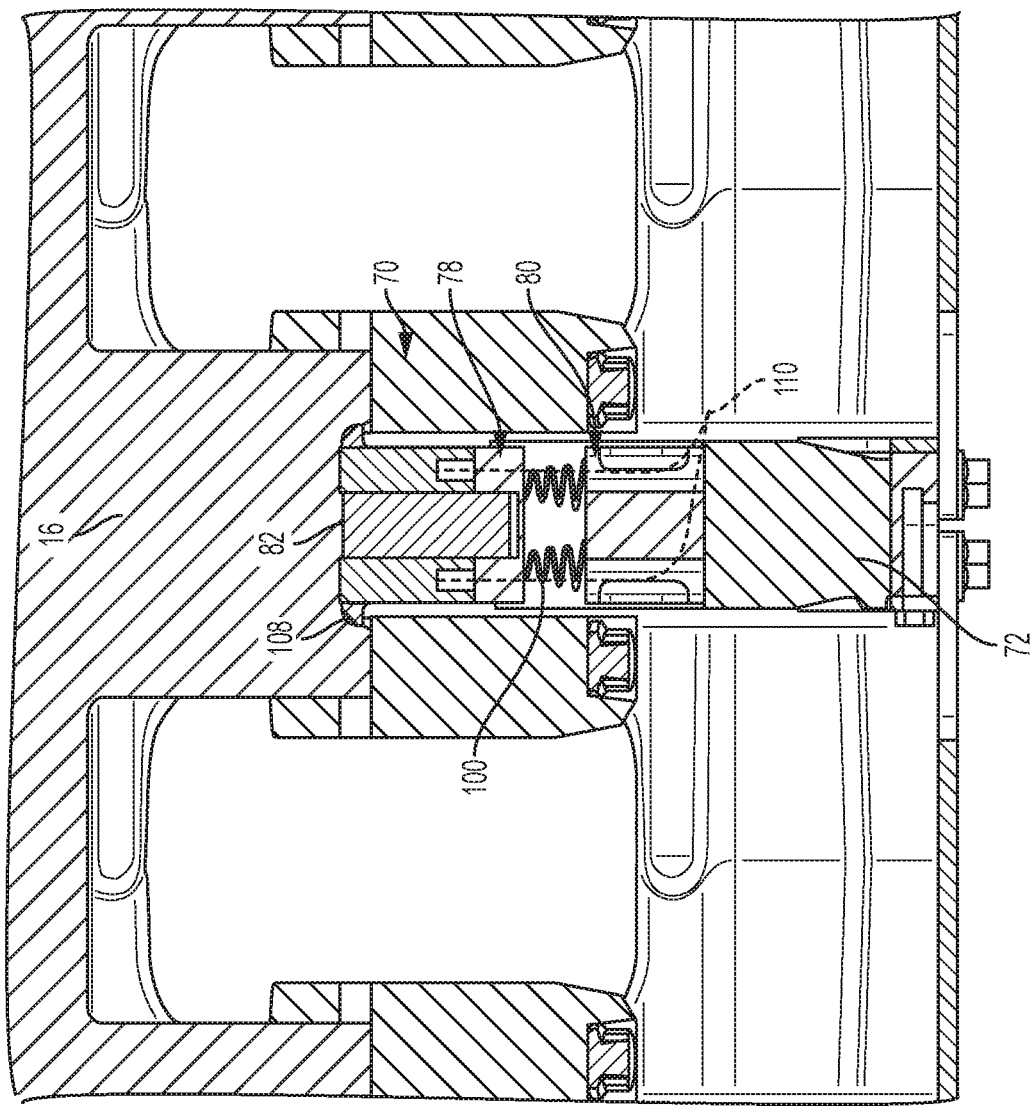
FIG. 10 is a side, cross-sectional view of the main fixture of FIG. 7 installed in an engine.

As crankshaft 10 rotates, sensors 88, 90 are maintained in contact with main journal 16 by springs 100 to measure main journal 16 for defects. As best shown in FIG. 10, tabs 108 of upper housing 78 engage the crankshaft cheeks to prevent side to side movement. Lead wires 110 extend from sensors 88, 90 and are routed out of the engine through an opening.

FIGS. 13, 14, 15, 16A and 16B depict another embodiment of a main fixture according to the present disclosure. Many components of main fixture 120 are substantially the same as components of main fixture 70, and retain the same reference numerals. The primary differences between main fixture 120 and main fixture 70 are that main fixture 120 includes structure to accommodate guide studs and anti-rotation wings as described below.

Figure 13:
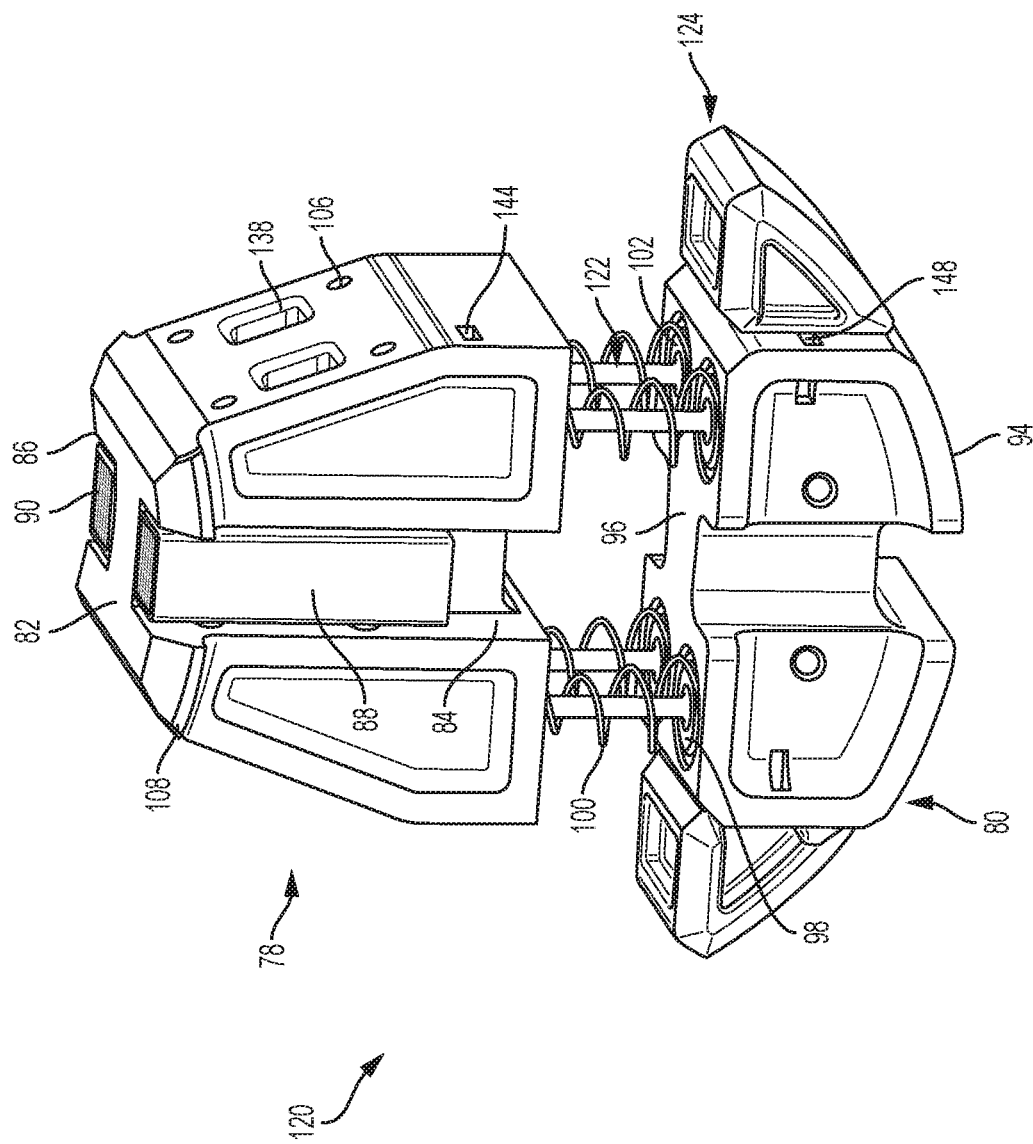
FIG. 13 is a perspective view of a main fixture according to another embodiment of the present disclosure.
Figure 14:
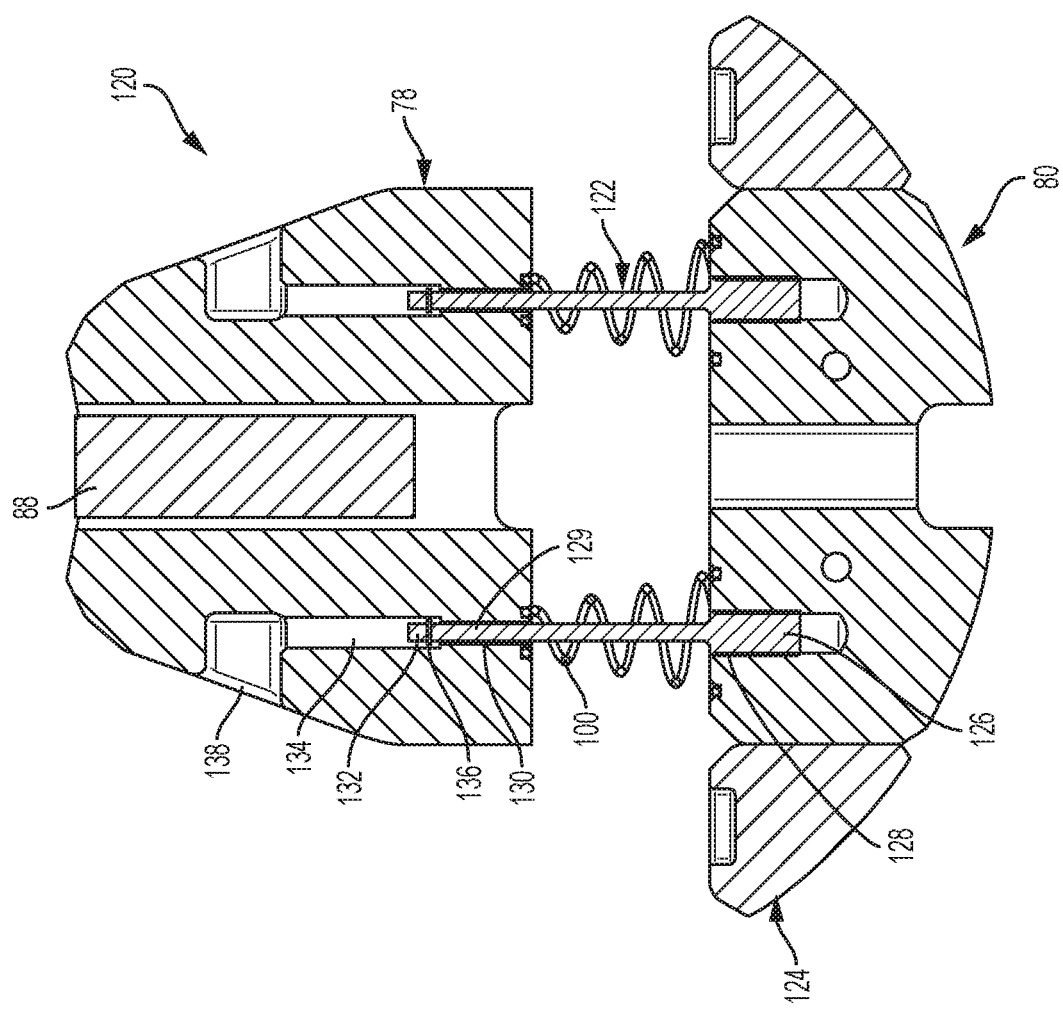
FIG. 14 is a cross-sectional view of the main fixture of FIG. 13.

Referring now to FIG. 13, main fixture 120 includes guide studs 122 (made of steel in one embodiment) and lower housing 80 is connected to anti-rotation wings 124. As best shown in FIG. 14, each guide stud 122 includes a lower end 126 that is threaded into a threaded bore 128 formed in lower housing 80, a body 129 that extends through a spring 100 and into an opening 130 formed into upper housing 78. Each guide stud 122 further includes an upper end 132 that extends into an enlarged diameter opening 134 formed into upper housing 78. A retaining washer 136 is attached to upper end 132 as is further described below. Each enlarged diameter opening 134 in upper housing 78 is in communication with an access opening 138.

Figure 15:
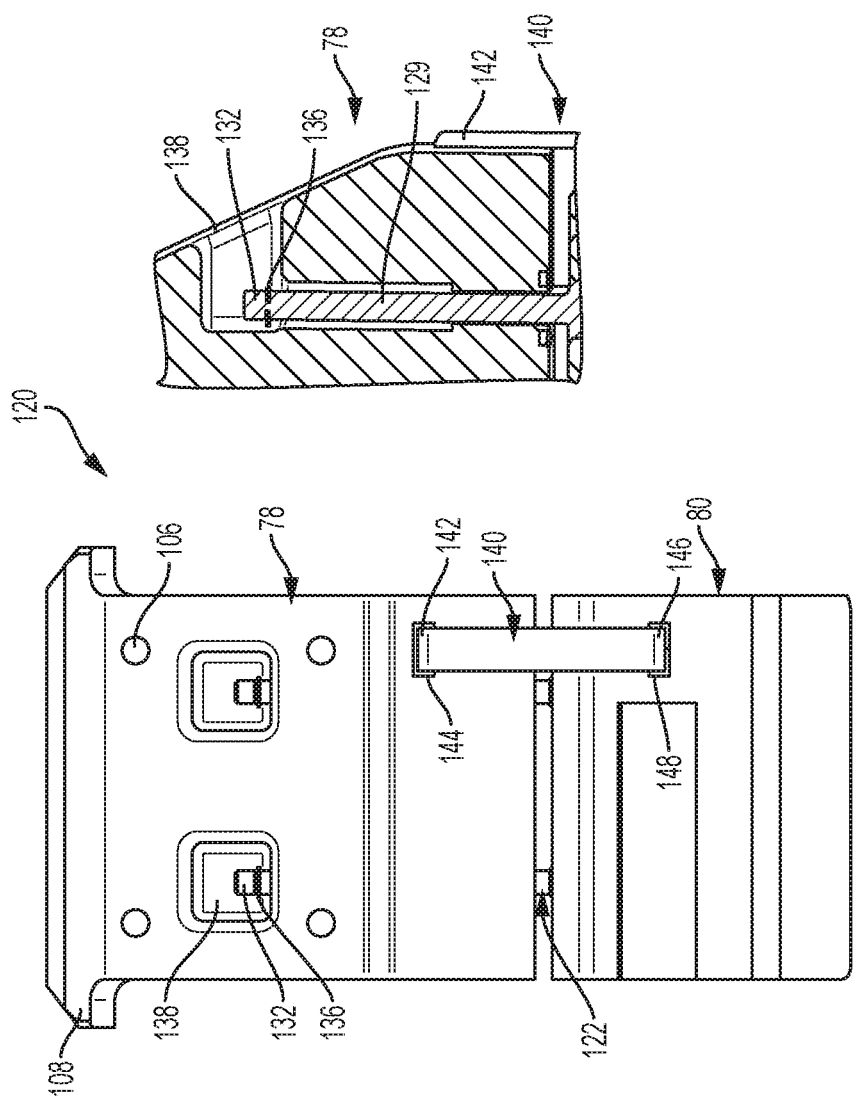
FIG. 15 is a side view of the main fixture of FIG. 13 in a compressed state.

During assembly, guide studs 122 are screwed into threaded bores 128 of lower housing 80. Springs 100 are placed onto guide studs 122 and upper housing 78 is placed onto guide studs 122 such that guide studs 122 enter openings 134. When springs 100 are substantially compressed between upper housing 78 and lower housing 80 as shown in FIG. 15, C-clips 140 are installed onto main fixture 120 to retain it in a compressed state. C-clips 140 include an upper end 142 that fits into a slot 144 formed in upper housing 78 and a lower end 146 that fits into a slot 148 formed into lower housing 80 to hold the housings 78, 80 in the compressed state. When the housings 78, 80 are in the compressed state, upper ends 132 of guide studs 122 are accessible through access openings 138 of upper housing 78. Consequently, retaining washers 136 can be installed onto upper ends 132 of guide studs 122. C-clips 140 are left in place during installation of main fixture 120, but are removed thereafter. As best shown in FIG. 14, retaining washers 136 may limit the travel of upper housing 78 relative to lower housing 80 by engaging a lower end of enlarged diameter openings 134. As best shown in FIGS. 16A and 16B, lower housing 80 includes a pair of cutouts 150 configured to receive and retain matching protrusions (not shown) from anti-rotation wings 124 to hold anti-rotation wings 124 in place.

As used herein, the modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range "from 2 to 4."

The connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus While the embodiments have been described as having exemplary designs, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this invention pertains.

We claim:

1. A device for identifying defects in a crankshaft while the crankshaft is installed on an engine, comprising:
   a housing configured to attach to a connecting rod;
   at least one sensor assembly mounted to the housing including at least one sensor; and
   a spring disposed between the housing and the at least one sensor to urge the at least one sensor into contact with a pin journal of the crankshaft as the crankshaft rotates.

2. The device of claim 1, wherein the at least one sensor assembly includes a first pin journal sensor assembly, a second pin journal sensor assembly and a pin fillet sensor assembly.

3. The device of claim 2, wherein the first pin journal sensor assembly includes a first sensor cage, a first Barkhausen noise sensor disposed at least partially within the first sensor cage, a first slide assembly attached between a first cutout in the housing and the first sensor cage, and a first spring positioned to urge the first Barkhausen noise sensor into contact with the pin journal as the crankshaft rotates.

4. The device of claim 3, wherein the first slide assembly includes a first guide rail attached to the first cutout and a first rail channel attached to the first sensor cage, the first guide rail being configured to move along a longitudinal axis of the first rail channel.

5. The device of claim 3, further including a first spring retainer attached to the housing and positioned to compress the first spring between the first spring retainer and a tab extending from the first sensor cage to thereby urge the first sensor cage and the first Barkhausen noise sensor toward the pin journal.

6. The device of claim 3, wherein the second pin journal sensor assembly includes a second sensor cage, a second Barkhausen noise sensor disposed at least partially within the second sensor cage, a second slide assembly attached between a second cutout in the housing and the second sensor cage, and a second spring positioned to urge the second Barkhausen noise sensor into contact with the pin journal as the crankshaft rotates.

7. The device of claim 6, wherein the second slide assembly includes a second guide rail attached to the second cutout and a second rail channel attached to the second sensor cage, the second guide rail being configured to move along a longitudinal axis of the second rail channel.

8. The device of claim 6, further including a second spring retainer attached to the housing and positioned to compress the second spring between the second spring retainer and a tab extending from the second sensor cage to thereby urge the second sensor cage and the second Barkhausen noise sensor toward the pin journal.

9. The device of claim 6, wherein the pin fillet sensor assembly includes a third Barkhausen noise sensor positioned to contact a pin fillet of the crankshaft as the crankshaft rotates.

10. A device for identifying defects in a main journal of a crankshaft while the crankshaft is installed on an engine, comprising:
 a fixture configured to mount between a main bearing cap and the main journal, the fixture comprising
  an upper housing having at least one sensor mounted thereto and positioned to engage the main journal;
  a lower housing having a lower surface to engage the main bearing cap; and
  at least one spring disposed between the upper housing and the lower housing to urge the upper housing toward the main journal, thereby maintaining the at least one sensor in contact with the main journal as the crankshaft rotates.

11. The device of claim 10, wherein the upper housing includes a curved upper surface having a pair of cutouts configured to receive a corresponding pair of sensors.

12. The device of claim 10, wherein the at least one spring includes four springs, each of the four springs having one end disposed in a spring seat formed in the lower housing and another end disposed on a spring button formed in the upper housing.

13. The device of claim 12, wherein each of the four springs is conical.

14. The device of claim 10, wherein the fixture further includes at least one guide stud having a lower end connected to a bore formed in the lower housing and a body that extends through the at least one spring into an opening formed in the upper housing.

15. The device of claim 14, wherein the at least one guide stud includes an upper end that extends into the opening and receives a retaining washer.

16. The device of claim 15, wherein the opening includes an access opening for installing the retaining washer onto the upper end of the at least one guide stud.

17. The device of claim 10, wherein the fixture further includes a C-clip having an upper end and a lower end, the upper housing having a slot configured to receive the upper end of the C-clip and the lower housing having a slot configured to receive the lower end of the C-clip such that when the C-clip is installed, the upper housing and the lower housing are held by the C-clip in a compressed state to permit installation of the fixture between the main bearing cap and the main journal.

18. The device of claim 10, wherein the fixture further comprises a pair of anti-rotation wings coupled to the lower housing.

19. The device of claim 10, wherein the at least one sensor is a Barkhausen noise sensor.

20. A system for identifying defects in a crankshaft mounted in an engine, comprising:
 a first fixture having a first housing configured to couple to a connecting rod, and a first sensor assembly including a first pin journal sensor and a first spring situated to urge the first pin journal sensor into contact with a pin journal of the crankshaft as the crankshaft rotates; and
 a second fixture having a second housing with a second sensor assembly including a second main journal sensor mounted thereto, and at least one second spring situated to urge the second main journal sensor into contact with a main journal of the crankshaft as the crankshaft rotates.

21. The system of claim 20, wherein the first sensor assembly includes a first sensor cage and a first slide assembly attached between a first cutout in the first housing and the first sensor cage, the first pin journal sensor being at least partially within the first sensor cage.

22. The system of claim 21, wherein the first fixture further incudes a second sensor assembly including a second pin journal sensor and a second spring situated to urge the second pin journal sensor into contact with the pin journal as the crankshaft rotates.

23. The system of claim 20, wherein the first pin journal sensor is a Barkhausen noise sensor and the second main journal sensor is a Barkhausen noise sensor.

24. A method for detecting defects in a crankshaft while the crankshaft is installed in an engine, comprising:
 replacing an end rod cap of a connecting rod with a pin fixture sized to approximately match a diameter of a pin journal of the crankshaft, the pin fixture including at least one sensor biased into contact with the pin journal; and
 rotating the crankshaft.

25. The method of claim 24, wherein the at least one sensor is a Barkhausen noise sensor.

* * * * *